(12) United States Patent
Mahnke et al.

(10) Patent No.: US 10,325,508 B2
(45) Date of Patent: Jun. 18, 2019

(54) APPARATUS AND ASSOCIATED METHODS FOR COLLISION AVOIDANCE

(71) Applicant: NXP B.V.

(72) Inventors: Holger Mahnke, Hohenwestedt (DE); Abdellatif Zanati, Hamburg (DE); Michael Doescher, Hamburg (DE); Gennaro Gentile, Hamburg (DE)

(73) Assignee: NXP B.V., Eindhoven (NL)

( * ) Notice: Subject to any disclaimer, the term of this patent is extended or adjusted under 35 U.S.C. 154(b) by 4 days.

(21) Appl. No.: 15/812,647

(22) Filed: Nov. 14, 2017

(65) Prior Publication Data

US 2018/0165976 A1   Jun. 14, 2018

(30) Foreign Application Priority Data

Dec. 12, 2016 (EP) .................................. 16203550

(51) Int. Cl.
```
G08G 9/02      (2006.01)
G01S 13/76     (2006.01)
G01S 13/93     (2006.01)
G08B 21/02     (2006.01)
G08G 1/005     (2006.01)
```
(Continued)

(52) U.S. Cl.
CPC .............. *G08G 9/02* (2013.01); *G01S 13/765* (2013.01); *G01S 13/93* (2013.01); *G01S 13/931* (2013.01); *G08B 21/02* (2013.01); *G08G 1/005* (2013.01); *G08G 1/012* (2013.01); *G08G 1/166* (2013.01)

(58) Field of Classification Search
CPC ..................................................... G08B 21/02
USPC ........ 340/944, 539.11, 539.13, 573.1, 573.4; 367/93, 99
See application file for complete search history.

(56) References Cited

U.S. PATENT DOCUMENTS 4,131,791 A * 12/1978 Lego, Jr. ................. G01S 17/06
349/1
4,290,126 A * 9/1981 McFadyen ......... G08B 13/1636
367/93

(Continued)

FOREIGN PATENT DOCUMENTS

CN      103152483 B      7/2015
DE      100 41 714 A1    5/2002

(Continued)

OTHER PUBLICATIONS

Lameira, A. et al.,"Correia, Local object detection and recognition in mobile devices",19th International Conference on Systems, Signals and Image Processing (IWSSIP), Vienna, 2012, pp. 193-196 (2012).

(Continued)

*Primary Examiner* — Hongmin Fan
(74) *Attorney, Agent, or Firm* — Rajeev Madnawat

(57) ABSTRACT

An apparatus comprising a hand-portable electronic device including a detection-and-ranging element configured to provide spatial information of one or more physical objects in a space around the hand-held portable electronic device for collision avoidance, the detection-and-ranging element configured to transmit one or more electromagnetic, wireless detection signals and configured to detect one or more reflections of said one or more electromagnetic, wireless detection signals from the one or more objects.

15 Claims, 2 Drawing Sheets

(51) Int. Cl.
*G08G 1/01* (2006.01)
*G08G 1/16* (2006.01)

(56) References Cited

U.S. PATENT DOCUMENTS

| | | | | |
|---|---|---|---|---|
| 5,341,346 | A * | 8/1994 | Youlton | A61F 9/08 367/116 |
| 7,167,082 | B2 * | 1/2007 | Stigall | A41D 13/00 340/407.1 |
| 8,253,589 | B2 * | 8/2012 | Grimm | G01S 5/0072 340/539.1 |
| 8,630,758 | B2 * | 1/2014 | Ehrler | B61L 23/06 246/217 |
| 8,760,289 | B2 * | 6/2014 | Leppanen | B66C 15/06 340/435 |
| 8,922,431 | B2 * | 12/2014 | Bruno | B60W 30/0953 342/450 |
| 9,420,559 | B2 * | 8/2016 | Bai | H04W 64/00 |
| 9,536,409 | B1 * | 1/2017 | Barth | H04W 4/027 |
| 9,788,101 | B2 * | 10/2017 | Chizi | H04R 1/1091 |
| 2002/0011924 | A1 * | 1/2002 | Schwartz | B60Q 1/54 340/425.5 |
| 2002/0024675 | A1 * | 2/2002 | Foxlin | G02B 27/017 356/620 |
| 2010/0292923 | A1 | 11/2010 | Zhang | |
| 2014/0078275 | A1 * | 3/2014 | Joao | G08B 21/02 348/61 |
| 2014/0152772 | A1 * | 6/2014 | Feyh | G01J 5/0859 348/46 |
| 2015/0109148 | A1 | 4/2015 | Cheatham et al. | |
| 2015/0109149 | A1 * | 4/2015 | Duncan | G08G 1/005 340/944 |
| 2015/0310664 | A1 * | 10/2015 | Boussard | G06T 19/006 345/633 |
| 2016/0174842 | A1 | 6/2016 | Hyde et al. | |
| 2017/0309149 | A1 * | 10/2017 | Kaura | G08B 3/00 |
| 2018/0007276 | A1 * | 1/2018 | Ollila | H04N 5/23293 |

FOREIGN PATENT DOCUMENTS

| | | |
|---|---|---|
| EP | 2128648 A1 | 12/2009 |
| EP | 2846172 A1 | 3/2015 |

OTHER PUBLICATIONS

Braveen, S. et al., "Miniature radar for mobile devices", IEEE High Performance Extreme Computing Conference (HPEC), Waltham, MA, pp. 1-8. (2013).

* cited by examiner

Figure 3
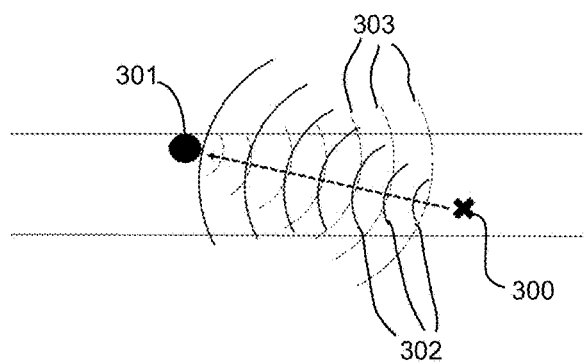
Figure 4
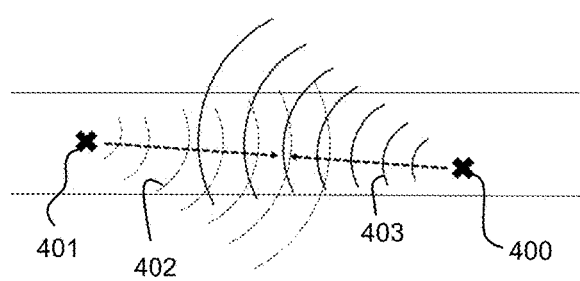
Figure 5
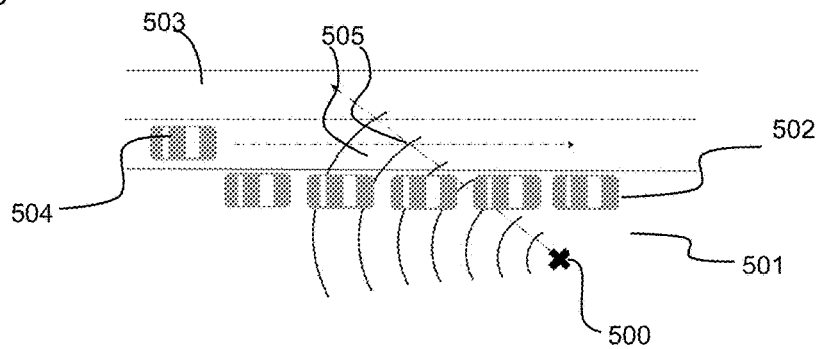
Figure 6
600 — providing for spatial information of one or more physical objects in a space around the hand-held portable electronic device for collision avoidance by transmitting one or more electromagnetic, wireless detection signals and detecting one or more reflections of said one or more electromagnetic, wireless detection signals from the one or more objects.

APPARATUS AND ASSOCIATED METHODS FOR COLLISION AVOIDANCE

CROSS-REFERENCE TO RELATED APPLICATIONS

This application claims the priority under 35 U.S.C. § 119 of European Patent application no. 16203550.5, filed on Dec. 12, 2016, the contents of which are incorporated by reference herein.

The present disclosure relates to a hand-portable electronic device that includes a detection-and-ranging element configured to provide spatial information of one or more physical objects in a space around the hand-held portable electronic device, which may be used for collision avoidance or other purposes.

According to a first aspect of the present disclosure there is provided an apparatus comprising a hand-portable electronic device including a detection-and-ranging element configured to provide spatial information of one or more physical objects in a space around the hand-held portable electronic device for collision avoidance, the detection-and-ranging element configured to transmit one or more electromagnetic, wireless detection signals and configured to detect one or more reflections of said one or more electromagnetic, wireless detection signals from the one or more physical objects.

In one or more embodiments the apparatus is configured to, based on the spatial information from the detection-and-ranging element and predetermined possible-collision-parameters, provide for presentation of an alert to a user of the hand-portable electronic device.

In one or more examples, the alert comprises one or more of:
  i) a visual message or graphic provided for display on a display of the hand-portable electronic device;
  ii) the hiding of a currently displayed image on a display of the hand-portable electronic device;
  iii) an acoustic alert;
  iv) a haptic alert;
  v) a visual indicator on a body of the electronic device.

In one or more embodiments, the spatial information includes a trajectory (heading and/or speed) of the one or more objects. In one or more examples, the trajectory may be determined by way of the detection-and-ranging element being configured to transmit time spaced detection signals to identify changes in the location of the one or more objects in the space.

In one or more embodiments the possible-collision-parameters comprise one or more of:
  i) an object defined by the spatial information is within a predetermined distance of the hand-portable electronic device;
  ii) an object defined by the spatial information has a trajectory from which it is determined that said trajectory places the object, at some time in the future, coincident with the hand-portable electronic device or a predetermined area therearound.

In one or more embodiments, at least one of the hand-portable electronic device and the detection-and-ranging element is configured to transmit a wireless beacon signal for receipt by one or more remote devices, the wireless beacon signal for identifying the location of the hand-portable electronic device, and therefore its user, to the one or more remote devices.

In one or more embodiments, the remote device is an automobile and the beacon signal is configured to be received by an automotive radar system of the automobile.

In one or more embodiments, the beacon signal is encoded with information for the remote device, the information comprising one or more of:
  i) information to identify the user of the hand-portable electronic device as a person for categorisation as such by the remote device;
  ii) information to identify the hand-portable electronic device as an object that is movable for categorisation as such by the remote device;
  iii) information to identify the trajectory of the hand-portable electronic device to the remote device based on measured trajectory data;
  iv) information to identify the trajectory of the hand-portable electronic device to the remote device based on route guidance provided to the user by the hand-portable electronic device;
  v) information on whether or not the user is currently looking at the hand-portable electronic device based on determined gaze direction data;
  vi) information indicative of whether or not a collision with the remote device is possible as determined by the hand-portable electronic device.

In one or more examples, the above-mentioned beacon signal may be provided independently of the detection-and-ranging element capturing the spatial information described herein and accordingly we disclose an electronic device configured to transmit a beacon signal encoded with one or more of location information and the information listed above.

In one or more examples, the space comprises a sub-set of the space around the hand-held portable electronic device, the subset comprising a region in front of the user while using the hand-held portable electronic device.

In one or more examples, the detection-and-ranging element is configured to provide the spatial information based on when the hand-portable electronic device is being used.

In one or more examples, determination of when the hand-portable electronic device is being used is based on one or more of; a key or screen lock function being unlocked; receipt of user input by the device within predetermined activity period; a detected gaze direction of the user being towards the device; a detected movement of the device; a detected movement of the device for at least a predetermined minimum-movement time; detected movement of the device above a predetermined minimum speed; detected movement of the device below a predetermined maximum speed.

In one or more examples, at least one of the hand-portable electronic device and the detection-and-ranging element is configured to receive a remote-beacon signal, the remote-beacon signal containing information to identify at least the location of a remote device, wherein the information of the remote beacon signal and the spatial information is used in combination for collision avoidance.

In one or more examples, the apparatus is configured to correlate the spatial information with the information from one or more remote beacon signals to identify one or more objects in the space as associated with the remote device from which the one or more beacon signals are received.

In one or more examples, the remote-beacon signal is encoded with information for the apparatus, the information comprising one or more of:
  i) information to identify a user of the remote device as a person for categorisation as such by the apparatus;

ii) information to identify the remote device as an object that is movable for categorisation as such by the apparatus;

iii) information to identify the trajectory of the remote device iv) information on whether or not a user of the remote device is currently looking at the remote device;

v) information on whether or not a collision with the user is possible as determined by the remote device.

In one or more examples, the detection-and-ranging element is configured to transmit the one or more electromagnetic, wireless detection signals at a rate less than 10 Hz.

In one or more examples, the hand-portable electronic device comprises one of a mobile telephone, a smartphone, a Personal Digital Assistant, a smartwatch, an e-book reader, a digital camera, smart eyewear, and a tablet computer.

According to a second aspect of the present disclosure there is provided a method performed by a hand-portable electronic device, the method comprising;

providing for spatial information of one or more physical objects in a space around the hand-held portable electronic device for collision avoidance by transmitting one or more electromagnetic, wireless detection signals and detecting one or more reflections of said one or more electromagnetic, wireless detection signals from the one or more objects.

According to a third aspect of the present disclosure there is provided a computer program or a computer readable medium comprising computer program code which when executed on a hand-portable electronic device having a processor and associated memory, causes the providing of spatial information of one or more physical objects in a space around the hand-held portable electronic device for collision avoidance by transmitting one or more electromagnetic, wireless detection signals and detecting one or more reflections of said one or more electromagnetic, wireless detection signals from the one or more objects.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 3 shows a plan view of a first in-use example of the apparatus;

FIG. 4 shows a plan view of a second in-use example of the apparatus;

FIG. 5 shows a plan view of a third in-use example of the apparatus;

FIG. 6 shows an example method.

Hand-portable electronic devices or "mobile devices", such as, but not limited to, smartphones, are being used ubiquitously by pedestrians and bicyclists in a rather careless (if not illegal in the case of bicyclists) manner. Accordingly, while using the hand-portable electronic device, a user's awareness of their surroundings is reduced. Rather than paying attention to their surroundings, or obstacles in their path, the user may be fully concentrating on the content displayed on their electronic device. This may be a serious hazard as pedestrians as well as bicyclists are vulnerable participants where there is automobile traffic, where collisions may be fatal. Further collisions may occur between pedestrians themselves, between a pedestrian and a static object such as a lamppost, between pedestrians and automobiles or bicyclists, as well as any other moving object.

While pedestrians and bicyclists are specifically mentioned above, other hand-portable electronic device users are at risk of collisions, such as users participating in sport, such as joggers. Further, while carelessness may be a factor in collisions occurring, poor weather, such as fog or low light, can also be a factor.

Figure 1:
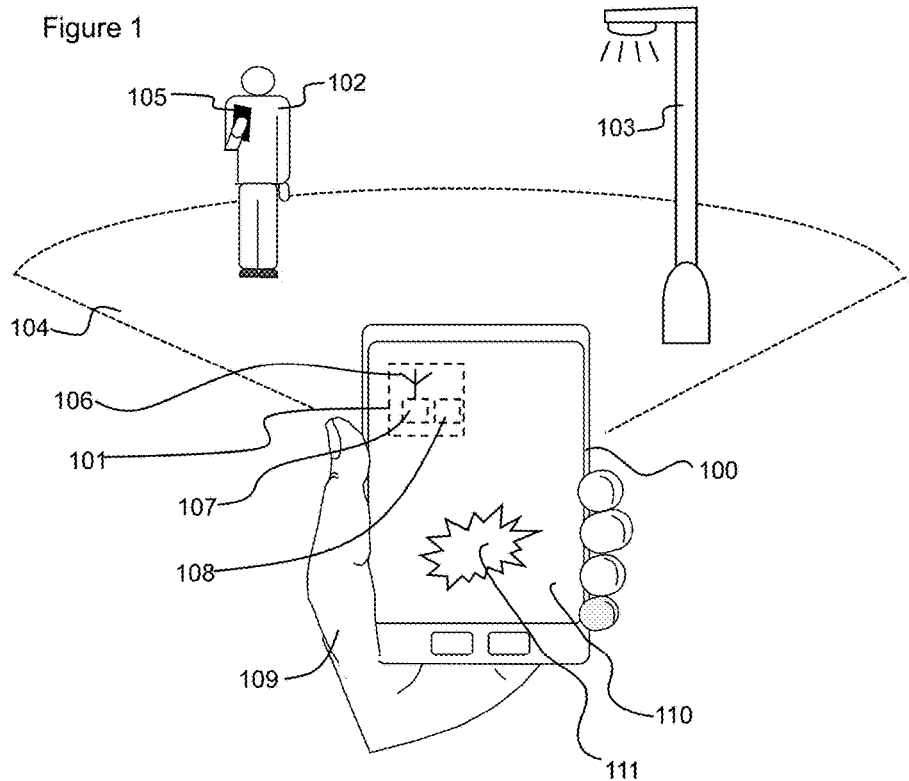
FIG. 1 shows an example embodiment of an apparatus.

FIG. 1 shows an apparatus comprising a hand-portable electronic device 100, which in this example comprises a smart phone. The device 100 is held by a user 109, the hand of which is shown in FIG. 1. It will be appreciated that in one or more other example embodiments, the device 100 may comprise any one of a mobile telephone, a Personal Digital Assistant, a smartwatch, an e-book reader, a digital camera, smart eyewear, and a tablet computer. In fact, the device 100 may be any mobile device that may captivate the attention of a user to the detriment of an appreciation of their surroundings such that the risk of collision with another object is increased.

The hand-portable electronic device 100 includes a detection-and-ranging element 101, which is shown in dashed lines to illustrate its incorporation in the circuitry of the device 100. In other embodiments, the detection-and-ranging element 101 may comprise a peripheral connected to the electronic device 100. The detection-and-ranging element 101 is configured to provide spatial information of one or more physical objects 102, 103 in a space 104 around the hand-held portable electronic device 100. In this example, the physical objects comprise a user 102, who also happens to be using a hand-portable electronic device 105 (which shall be termed a "remote device") and a lamppost 103. The spatial information may provide for the identification of the location of objects around the user 109. The spatial information may comprise the current location of the objects 102, 103 or may comprise a depth map from which a different apparatus, such as circuitry of the electronic device 100, may determine the location of the objects 102, 103. The detection-and-ranging element 101 may be configured to transmit one or more electromagnetic, wireless detection signals using an antenna 106. The antenna 106 may be a dedicated antenna for detection and ranging or may be an antenna of the electronic device 100. The detection-and-ranging element 101 may further be configured to detect, using the antenna 106, one or more reflections of said one or more electromagnetic, wireless detection signals from the one or more objects 102, 103.

The detection of the reflected signals and, in particular, the timing of the received signals, may enable the determination of the location of the objects 102, 103 in the space 104.

The detection-and-ranging element 101 may comprise a memory 107, a processor 108, and input and output. The input may receive the control signals from the electronic device 100. The output may provide signalling to cause the transmission of the one or more detection signals from the antenna 106 and, optionally, to provide the spatial information to the electronic device 100. In one or more examples, the detection-and-ranging element 101 may, at least in part, use a memory and processor of the electronic device 100 for performing its function. Thus, in one or more examples, the detection-and-ranging element 101 may comprise the hardware for transmission of the detection signals and receipt of the reflected signals and interpretation of those reflected signals for generation of the spatial information may be provided by the electronic device 100. In one or more examples, the detection-and-ranging element 101 may be configured to interpret the reflected signals and generate the spatial information for forwarding to the electronic device 100 and/or providing information/instructions to the electronic device 100 based on the spatial information. In one or more examples, the functionality provided by the detection-and-ranging element 101 may be between these two above-mentioned examples.

In this embodiment only one processor 108 and one memory 107 are shown but it will be appreciated that other embodiments may utilise more than one processor and/or more than one memory (e.g. same or different processor/memory types). In this example the input, output, processor 108 and memory 107 are all electrically connected to one another internally to allow for electrical communication between the respective components 107, 108.

Further, the detection-and-ranging element 101 may be provided as an Application Specific Integrated Circuit (ASIC) for the portable electronic device 100.

In other embodiments the detection-and-ranging element 101 can be a module for the electronic device. The processor 108 may be a general purpose CPU of the device 100 and the memory 107 may comprise general purpose memory comprised by the device 100. The hand-portable electronic device may include a touch sensitive display 110.

The processor 108, in this example, is configured to execute/process information received via the input in accordance with instructions stored in the form of computer program code on the memory 107. The output signalling generated by such operations from the processor 108 is provided onwards to further components via the output.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

Thus, while it may be described in this example, that particular functionality is performed by the detection-and-ranging element 101, said functionality may, in one or more embodiments, be performed wholly or in part by a processor and memory of the hand-portable electronic device 100.

The detection-and-ranging element 101 may be considered to be a radar element. Radar (originally an acronym, RADAR) stands for RAdio Detection And Ranging. While radar technology was originally directed towards the use of radio frequency electromagnetic waves for detection and ranging, this term is now often used generically for electromagnetic waves of any frequency that are used for detection and ranging purposes.

A radar element performs detection and ranging by emitting an electromagnetic wave, such as a pulse, from a transmission antenna and measuring the time taken for the reflected wave to be detected at a receiving sensor. The amount of time taken for a reflected wave to reach an object and be reflected back provides an indication of the distance of that object from the radar element. By using a series of pulses or a continuous wave mode of operation (such as in a continuous wave radar), a time-resolved distance profile of a space around a radar system may be obtained. A radar element may also be configured to determine the speed of an object.

The spatial information may comprise the current location of the objects 102, 103. The spatial information may include information relating to the movement of or trajectory of the one or more objects 102, 103 relative to the device 100. In one or more examples, the spatial information may be obtained at repeated or regular intervals. Accordingly, the movement of the one or more objects 102, 103 may be determined from differences between time-spaced spatial information.

The detection-and-ranging element 101 or the device 100, based on the spatial information from the detection-and-ranging element 101 and predetermined possible-collision-parameters, may provide for presentation of an alert 111 to the user 109 of the hand-portable electronic device 100. Accordingly, if the detected location and/or the trajectory of the objects 102, 103 is such that a collision between those objects and the user of the device 100 may occur, the user may be alerted by the device 100 or a device under the control thereof. In the example of FIG. 1, the alert 111 comprises a visual alert on the display 110 of the electronic device 100. Accordingly, the detection-and-ranging element 101 may provide signalling to the electronic device 100 to cause it to display the alert, or, in one or more examples, the electronic device 100 may use the spatial information provided to it by the detection-and-ranging element 101 to determine the possible future occurrence of a collision and provide for the presentation of the alert 111.

While in this example the alert 111 is a visual graphic, it will be appreciated that the alert may be a visual message provided for display on the display 110 of the hand-portable electronic device, such as a textual warning that a collision is imminent or a graphic indicative of the direction from which the object may collide with the user. In one or more examples, the alert is provided by the hiding of a currently display image on a display of the hand-portable electronic device. The currently displayed image could be replaced with a full or part screen warning, block colour, flashing effect or the like to warn the user to a possible imminent collision. In one or more examples, the alert comprises an acoustic alert, such as generated by a speaker of the device 100 or a headset (not shown) or smart watch (not shown) under the control of the device 100. In one or more examples, the alert comprises a haptic alert, such as a vibration generated by haptic motor of the device 100 or a peripheral device such as a smart watch (not shown) under the control of the device 100. In one or more examples, the alert may be provided by a visual indicator, such as an LED, on a body of the electronic device 100 or peripheral device, such as a connected smartwatch.

The predetermined possible-collision-parameters may comprise one or more conditions or qualifying relative movement of the user and/or the objects detected by the detection-and-ranging element 101 which may lead to a collision therebetween. The possible-collision-parameters may define when the alert is provided, even if the occurrence of a possible collision can be determined beforehand. Thus, even if the user and an object are determined to be on a collision course, the generation of the alert may be delayed until up to 5, 4, 3, 2 or 1 seconds before a predicated time of the collision, to provide chance for the user 109/object 102 to change course. The possible-collision-parameters may be dependent on the relative closing speed of the user and object. Thus, whether or not particular relative movement qualifies as a possible collision and/or the time the alert is generated may be dependent on the relative closing speed of the user and object.

The possible-collision-parameters may be tailored to any particular situation but the following example possible-collision-parameters may provide an example of when the element 101 or device 100 may determine that a collision is possible.

For example, if it is determined that an object 102, 103, the location of which is defined by the spatial information, is within a predetermined distance of the hand-portable electronic device 100, it may be considered that a possible collision could occur. The predetermined distance may be up to 0.5, 1, 2, 3, 4 m of the user. The predetermined distance may be dependent on the speed of the user and/or the speed of the object, which may be obtained from a geographic positioning system of the device 100 (e.g. a GPS module) and the spatial information. For example, if the user is walking quickly or running, the predetermined distance may be greater than that if they were walking at a slower speed. In one or more examples, the possible-collision-parameter may define a situation in which a collision may occur if an object 102 has a trajectory from which it is determined that said trajectory places the object 102, 103, at some time in the future, coincident with the hand-portable electronic device 100 (and/or the user 109) or a predetermined area therearound. Accordingly, it may be determined that a possible collision may occur if the relative movement of the object and user places them on a collision course or a "close pass" (defined by the predetermined area).

The possible-collision-parameters may be dependent on the geographic location of the user. Thus, what qualifies and what does not qualify as a potential collision may be dependent on geographic location, for example in a city with automobile traffic or in a more rural area with possibly less traffic. The possible-collision-parameters may be dependent on the time of day, for example a city at rush hour may be congested with many people close together on the pavement and at crossings while at less busy times, such as mid-morning or mid-afternoon, there may be less congestion and therefore what qualifies as a possible collision may be modified accordingly. The possible-collision-parameters may be dependent on light levels or weather, for example visibility may be affected by the amount of light or weather and therefore what qualifies as a possible collision may be modified accordingly. Thus, the possible-collision-parameters may be adaptive to any one or more of the geographic location of the user, the time of day, light levels, and weather. The electronic device 100 may be configured to obtain such information from the internet or sensors of the electronic device 100.

The detection-and-ranging element 101 may be configured to provide for detection of objects in a space wholly surrounding the hand-held portable electronic device 100 or a subset of said space. For example, the space in which the detection-and-ranging element provides spatial information about objects therein may be based on a direction of travel of the electronic device/user or based on the orientation of the electronic device 100. For example, the space 104, as shown in FIG. 1, comprises a sub-set of the space around the hand-held portable electronic device 100 and, in particular, the space 104 comprises a region in front of the user while using the hand-held portable electronic device 100. The detection-and-ranging element 101 may have a wide detection angle, such as up to 180°, 160°, 150°, 140°, 130°, 120°, 100°. The space 104 may extend out from a rear (an opposite side to the display 110 of the device watched by the user) of the electronic device 100.

The electronic device 100 and/or detection-and-ranging element 101 may perform the calculations to determine whether the user 109 will collide with objects defined in the spatial information using their respective determined headings and speed.

The detection-and-ranging element 101 consumes energy by virtue of the transmittal of the detection signals and processing of the receipt of the reflections and therefore the provision of the spatial information. The energy for operation may be provided by a dedicated battery of the detection-and-ranging element 101 or a battery of the electronic device 100. Accordingly, operation of the detection-and-ranging element 101 to provide the spatial information may be based on when the hand-portable electronic device is being used. It may be assumed that the user may less aware of objects around them that may be hazardous to the user when they are using the device 100.

For example, the status of a key or screen lock function may be used to determine if the electronic device is being used. Thus, for an electronic device having a keypad or a touchscreen display, the electronic device 100 may report to the detection-and-ranging element 101 or the detection-and-ranging element 101 may request the locked/unlocked status. In one or more examples, the detection-and-ranging element 101 may be configured to provide the spatial information based on receipt of user input by the device 100 within a predetermined activity period, which may be indicative of the device 100 being actively used by the user. Many electronic devices 100 have cameras and/or other sensors and the detection-and-ranging element 101 may be configured to provide the spatial information based on a detected gaze direction of the user being towards the device. The detected gaze direction may be determined by a module of the electronic device 100 or the detection-and-ranging element 101/device 100 may be configured to determine whether or not the user is looking at the electronic device. For example, a hand-portable electronic devices such as a smart phone may have a front facing camera or other sensor, and the electronic device 100 may provide for determination of whether or not the user is looking at the device. Thus, in one or more examples, if the user is concentrating on the electronic device 100, the detection-and-ranging element 101 may be active to provide the spatial information but otherwise may be configured not to provide the spatial information. Whether or not the user is moving or the speed of movement may control the operation of the detection-and-ranging element 101. For example, a motion sensor of the device 100, such as a GPS sensor or accelerometer, may report, such as on request of the detection-and-ranging element 101, the movement of the device 100 and therefore the user. If the user is stationary, the detection-and-ranging element 101 may not provide the spatial information but if they are moving it may do so, which may comprise moving for a predetermined minimum-movement time, such as 1, 2, 5, 10, 15, 30 seconds. The predetermined minimum-movement time may be used to discern between the movement while the user's feet are substantially still, which may be less hazardous in terms of collision risk, and the user walking, which may be more hazardous. Further, the detection-and-ranging element 101 may be configured to receive information indicative of the movement of the electronic device or may provide for its capture, and, as mentioned above, provision of the spatial information may be limited to times based on the movement of the electronic device. In one or more examples, the apparatus may be primarily useful for pedestrians or cyclists and thus a predetermined maximum speed may be used to disable provision of the spatial information by the detection-and-ranging element 101 when that speed is exceeded, such as when the user is travelling in a car, train or bus, for example. Combinations of the above conditions may be used to determine when the detection-and-ranging element 101 is configured to provide the spatial information. It will be appreciated that while the above description mentions the detection-and-ranging element 101 providing or not providing the spatial information, the transmission of the detection signals may also be likewise controlled. Further, rather than the binary control of providing or not providing the spatial information, in other embodiments, the spatial information may be provided at a first rate and a lower, second (non-zero) rate based on the above conditions. In other embodiments, a plurality of different rates, including not providing the spatial information, may be provided that are dependent on the above conditions.

The detection-and-ranging element 101 may comprise a radar sensor integrated circuit. Such circuits typically are able to transmit and receive RF signals at around 77 GHz and are similar to what is used in motor vehicle based radar sensors. The radar sensor integrated circuit may be integrated into the hand-portable electronic device. The antenna 106, which may comprise one or more antennae, for transmitting and receiving the detection signals may be integrated into the device 100.

In one or more examples, detection of the location of objects by the detection-and-ranging element 101 may be performed by repetitive scans of the space around, or in front of, the electronic device 100. In one or more examples, the detection-and-ranging element 101 may be configured to detect objects within 20, 15, 10, 5, 4, 3, 2, 1 m of the electronic device 100 and therefore the user 109. In one or more examples, for users comprising pedestrians and moderate bicyclists the detection-and-ranging element 101 may be configured to transmit the one or more electromagnetic, wireless detection signals (for providing the spatial information) at a rate of up to 4 times, 3 times, 2 times or once per second. As an illustrative example, assuming a pre-warning time prior to a potential collision (i.e. time of providing the alert 111 to the predicted time of the potential collision) of 1 second, and also assuming a speed of 2 m/s for a pedestrian, and 5 m/s for a moderate bicyclist, this would translate into a detection distance of 2 m and 5 m respectively.

While a typical automotive radar sensing device consumes approximately 2-4 W and contains 2-4 transmission and 3-4 detection channels, the detection-and-ranging element 101 may be configured to use fewer channels. Further, the repetition rate, which may be a factor of 40 lower than a typical automotive radar sensor may translate into lower power consumption, reduced approximately by the same factor. Further power consumption savings over an automotive based radar sensor may be achieved by the reduced number of (especially, but not limited to) transmission channels. A one-channel detection-and-ranging element 101 may consume only ~25 mW during a constant application mode.

Thus, in one or more examples, the electronic device 100 and the detection-and-ranging element 101 may provide for scanning of the space around a user to identify objects that could pose a hazard. In one or more examples, the electronic device 100 and/or the detection-and-ranging element 101 may be configured to transmit information for remote devices, which may comprise the electronic devices of other users.

Figure 2:
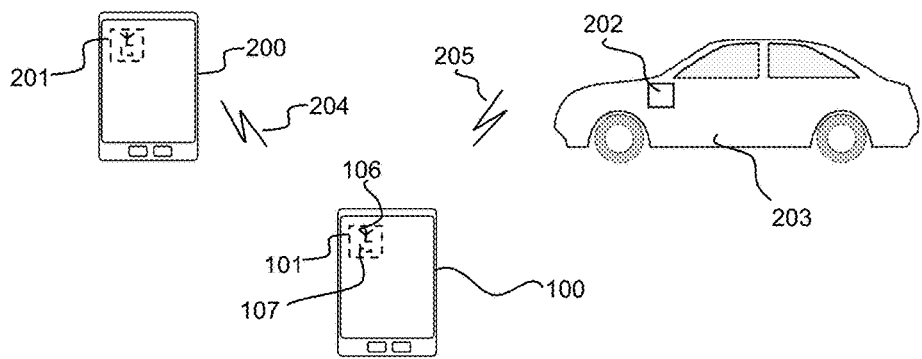
FIG. 2 shows the example apparatus as well as a first and second remote device.

FIG. 2 shows the electronic device 100 with the detection-and-ranging element 101 as well as a first remote device comprising a second electronic device 200, which also happens to have a detection-and-ranging element 201. FIG. 2 also illustrates a second remote device 202 comprising an electronic device integrated with a self-driving vehicle 203. The remote devices 200, 202 may also be configured to determine the location of objects in a space around them. The determination of the location of objects and, in one or more embodiments, the identification of the objects may be enhanced by wireless beacon signals being sent from and/or to the remote devices to provide information about the objects within the space "scanned" by each device 100, 200, 202.

The beacon signals may comprise the detection signals of other devices. Thus, the detection-and-ranging element 101 may be configured to detect the detection signals of other devices 200, 202 and based on the detection signals of other devices and the reflections of the element's 101 own detection signals, provide the spatial information. Properties of the other device's detection signals, such as in terms of phase, amplitude, multipath reflections, frequency shift or others, may be used (e.g. in part) to provide the spatial information. In one or more examples, the detection signals of remote devices are encoded with information for receipt by other devices, thereby acting as an "enhanced" beacon signal.

Thus, in one or more examples, the hand-portable electronic device 100 and/or the detection-and-ranging element 101 is configured to receive a remote-beacon signal 204, 205 from one or more of the remote devices 200, 202. The location of the objects with which the remote devices are associated (a person in the case of the device 200 and a car in the case of the device 202) may be determined by the detection-and-ranging element 101. In one or more examples, the remote-beacon signal 204, 205 may be considered to supplement the spatial information or vice-versa.

The remote-beacon signals 204, 205 may be configured to contain information to identify at least the location of a remote device 200, 202, wherein the information of the remote beacon signal and the spatial information is used in combination for collision avoidance. Thus, the location of the remote device may be encoded in the remote-beacon signal and may provide confirmation of the location determined in the spatial information. Accordingly, the apparatus 100 may be configured to correlate the spatial information with the information from one or more remote beacon signals 204, 205 to identify the location of the one or more objects (a user of the device 200 and the car 203) as being associated with the remote device 200, 202 from which the one or more beacon signals are received.

The remote-beacon signal may also be encoded with other information that may provide for added functionality of the apparatus 100. For example, while the detection-and-ranging element 101 may be able to identify the location of the object, the remote-beacon signal may provide information that enables the apparatus 100 to identify the object as a car or a person. Accordingly, the conditions upon which an alert 111 is provided may be different depending on the identity of the object determined from the remote beacon signal 204, 205. For example, if the apparatus 100 knows that an object it has detected by way of the detection signals is a car it may be given a greater hazard category than to a person, given that if the car were to suddenly start moving it would present a more grave collision risk than a person.

Thus, the remote-beacon signal 204, 205 may be encoded with information to identify a user of the remote device as a person for categorisation as such by the apparatus 100. The apparatus may be configured to provide a different alert 111 based on the category or the possible-collision-parameters may take account of the category. The remote-beacon signal 204, 205 may be encoded with information to identify the remote device as an object that is movable for categorisation as such by the apparatus 100. The apparatus may be configured to provide a different alert 111 based on the category or the possible-collision-parameters may take account of the category. In one or more examples, possible categories include one or more of; person, car, automobile, lorry, bus, train, moving object with a particular speed range, moving object with a particular stopping capability or any other.

The remote-beacon signal 204, 205 may be encoded with information to identify the trajectory of the remote device. The apparatus 100 may be configured to correlate the trajectory from the remote-beacon signal with any trajectory determined as part of the spatial information. In one or more examples, this may improve accuracy.

The remote-beacon signal 204, 205 may be encoded with information on whether or not a user of the remote device is currently looking at the remote device. Thus, the remote-beacon signal 204, 205 may provide information on how aware the user of the remote device is to their surroundings. The possible-collision-parameters may take account of the "awareness" measure of the user of the remote device in defining if the alert 111 is provided.

In one or more examples, in addition to being configured to interpret remote-beacon signals, the apparatus 100 may be configured to provide wireless beacon signals for the remote devices. The detection signals transmitted by the detection-and ranging element may be configured to provide the wireless beacon signals.

However, the device 100 may use any protocol to provide the wireless beacon signals, such as WiFi or Bluetooth® or any other standard. Likewise, the remote beacon signal may use any protocol, and/or those exemplified above.

Thus, at least one of the hand-portable electronic device 100 and the detection-and-ranging element 101 may be configured to transmit a wireless beacon signal for receipt by one or more remote devices 200, 202. The wireless beacon signal may contain location information for identifying the location of the hand-portable electronic device 100, and therefore its user 109, to the one or more remote devices 200, 202. The remote devices may be configured to use the location provided in the wireless beacon signal independently or in combination with any information they obtain about objects in their vicinity.

In addition to, or instead of, the location information described above, the wireless beacon signal may be encoded with other information for one or more remote devices in the vicinity of the electronic device 100, illustrated as the remote device 200, 202. The information of the wireless beacon signal may be assistive to the operation of the remote device and, in particular, assistive to navigation, collision avoidance and/or autonomous driving operation of the remote device.

In one or more examples, the wireless beacon signal may be encoded with information comprising information to identify the user of the hand-portable electronic device as a person for categorisation as such by the remote device. Thus, a remote device comprising an autonomous vehicle may therefore be able to better manage potential hazards if it is aware of what objects in its vicinity are. For example, a sensor of the autonomous vehicle may identify the user as an object in its vicinity and the wireless beacon signal, which may include the location of the user and the "person categorisation information", may enable the autonomous vehicle to assign attributes to that object for decision making purposes. For example, being a person, they must be avoided and they also have the potential to move into the path of the vehicle. In a further example, the information of the wireless beacon signal may identify the hand-portable electronic device as an object that is movable for categorisation as such by the remote device. The wireless beacon signal may be emitted from bollards, posts, electronic devices of people to better inform other electronic device and autonomous vehicles of the types of objects and therefore the type of hazard around them. In a further example, the apparatus may be configured to provide a wireless beacon signal comprising information to identify the trajectory of the hand-portable electronic device to the remote device based on measured trajectory data, such as from a GPS or accelerometer of the electronic device 100. Again, this additional information received by the remote device may supplement information obtained from one or more sensors of the remote device 203. The wireless beacon signal may be encoded with information to identify the trajectory of the hand-portable electronic device to the remote device based on route guidance provided to the user by the hand-portable electronic device. Thus, if the electronic device 200 has route guidance functionality and the user is following a route presented to them, the electronic device has information about where user may turn or move. This information or a subset thereof may be encoded in the wireless beacon signal so that other electronic devices 200, 202 can appreciate where the user may move next. As discussed above, the electronic device 100 may include functionality to identify where the user is looking and may therefore provide gaze direction data. The device 100 may be configured to use the gaze direction data to encode the wireless beacon signal with information on whether or not the user is currently looking at the hand-portable electronic device. Such information may be indicative of a level of awareness that can be used by other electronic devices 200, 202 when generating alerts corresponding to alert 111 or providing assessing risk/hazards during autonomous driving.

It will be appreciated that an electronic device configured to provide the wireless beacon signal may be provided by an electronic device without the detection-and-ranging element 101 capturing the spatial information described herein.

The wireless beacon signal and/or the remote beacon signal may indicate to the respective other device whether or not a collision with said user/other device has been determined as possible. Accordingly, even if only one of the electronic device 100 and remote device 200, 202 is able to determine that a collision is possible, both electronic devices may be able to provide an alert based on the beacon signals providing this collision risk information.

FIG. 3 illustrates a situation in which a user 300 (with their electronic device 100, not labelled) walking towards a static object 301. The electronic device 100 of the user and, in particular, the detection-and-ranging element thereof may transmit detection signals 302. The reflections of the detection signals, shown by dashed lines 303 may be received by the detection-and-ranging element and from which the spatial information may be provided for collision avoidance and generating an alert 111.

FIG. 4 illustrates a user 400 (with their electronic device 100, not labelled) bicycling towards a different user 401 having a remote device. The detection signals of the electronic device 100 of the user 400 as well as the detection signals of the electronic device of the user 401 may or may not have the range to provide adequate reflected detection signals for generation of spatial information that identifies the location of each other. However, the electronic device 100 of user 400 may be able to detect the detection signals 402 of the electronic device of the user 401. Thus, the detection signals 402 act as remote beacon signals. Likewise the electronic device of the user 401 may be able to detect the detection signals 403 of the electronic device 100 of user 400. Thus, the detection signals 403 act as wireless beacon signals.

Thus, the electronic devices of the users 400, 401 may be configured to generate an alert, at least in part, based on the respective beacon signals.

FIG. 5 illustrates a user 500 (with their electronic device 100, not labelled) walking along a pavement 501 alongside parked cars 502. The parked cars 502 are adjacent a road 503 upon which is driving an autonomous vehicle 504. The user 500 may be hidden from the "view" of the autonomous vehicle 504 by the parked cars 502. The detection signals 505 transmitted by the detection-and-ranging element of the user's 500 electronic device may propagate into the road 503. An electronic device (similar to 202 of FIG. 2) of the autonomous vehicle 504 may be configured to detect the detection signals of the electronic device of the user 500. In addition, the detection signals 505 which may be encoded with information and may therefore comprise an "enhanced" beacon signal. Accordingly, the autonomous vehicle is informed of the presence of the user 500.

FIG. 6 illustrates an example method performed by a hand-portable electronic device, the method comprising providing 600 spatial information of one or more physical objects in a space around the hand-held portable electronic device for collision avoidance by transmitting one or more electromagnetic, wireless detection signals and detecting one or more reflections of said one or more electromagnetic, wireless detection signals from the one or more objects.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising a hand-held portable electronic device including a detection-and-ranging element configured to provide spatial information of one or more physical objects in a space around the hand-held portable electronic device for collision avoidance involving the one or more physical objects in the space around the hand-held portable electronic device, the detection-and-ranging element configured to transmit one or more electromagnetic, wireless detection signals and configured to detect one or more reflections of said one or more electromagnetic, wireless detection signals from the one or more physical objects, wherein the detection-and-ranging element is configured to transmit the one or more electromagnetic, wireless detection signals at a repetition rate of less than 10 Hz.

2. The apparatus of claim 1, wherein the apparatus is configured to, based on the spatial information from the detection-and-ranging element and predetermined possible-collision-parameters, provide for presentation of an alert to a user of the hand-portable electronic device.

3. The apparatus of claim 1, wherein the spatial information includes a trajectory of the one or more objects.

4. The apparatus of claim 2, wherein the possible-collision-parameters comprise one or more of:
   i) an object defined by the spatial information is within a predetermined distance of the hand-portable electronic device;
   ii) an object defined by the spatial information has a trajectory from which it is determined that said trajectory places the object, at some time in the future, coincident with the hand-portable electronic device or a predetermined area thereuround.

5. The apparatus of claim 1, wherein at least one of the hand-portable electronic device and the detection-and-ranging element is configured to transmit a wireless beacon signal for receipt by one or more remote devices, the wireless beacon signal for identifying the location of the hand-portable electronic device, and therefore its user, to the one or more remote devices.

6. The apparatus of claim 1, wherein the detection-and-ranging element is configured to detect the detection signals of other devices and based on the detection signals of the other devices and the one or more reflections of said one or more detection signals, provide the spatial information.

7. The apparatus of claim 5, wherein the beacon signal is encoded with information for the one or more remote devices, the information comprising one or more of:
   i) information to identify the user of the hand-portable electronic device as a person for categorisation as such by the one or more remote devices;
   ii) information to identify the hand-portable electronic device as an object that is movable for categorisation as such by the one or more remote devices;
   iii) information to identify the trajectory of the hand-portable electronic device to the one or more remote devices based on measured trajectory data;
   iv) information to identify the trajectory of the hand-portable electronic device to the one or more remote devices based on route guidance provided to the user by the hand-portable electronic device;
   v) information on whether or not the user is currently looking at the hand-portable electronic device based on determined gaze direction data;
   vi) information indicative of whether or not a collision with the one or more remote devices is possible as determined by the hand-portable electronic device.

8. The apparatus of claim 1, wherein the space comprises a subset of the space around the hand-held portable electronic device, the subset comprising a region in front of the user while using the hand-held portable electronic device.

9. The apparatus of claim 1, wherein the detection-and-ranging element is configured to provide the spatial information based on when the hand-portable electronic device is being used.

10. The apparatus of claim 1, wherein at least one of the hand-portable electronic device and the detection-and-ranging element is configured to receive a remote-beacon signal, the remote-beacon signal containing information to identify at least the location of a remote device, wherein the information of the remote-beacon signal and the spatial information is used in combination for collision avoidance involving the one or more physical objects in the space around the hand-held portable electronic device.

11. The apparatus of claim 10, wherein the apparatus is configured to correlate the spatial information with the information from the remote-beacon signal to identify one or more objects in the space as associated with the remote device from which the remote-beacon signal is received.

12. The apparatus of claim 2, wherein the alert comprises one or more of:
   i) a visual message or graphic provided for display on a display of the hand-portable electronic device;
   ii) the hiding of a currently displayed image on a display of the hand-portable electronic device;
   iii) an acoustic alert;
   iv) a haptic alert.

13. The apparatus of claim 1, in which the hand-portable electronic device comprises one of a mobile telephone, a smartphone, a Personal Digital Assistant, a smartwatch, an e-book reader, a digital camera, smart eyewear, and a tablet computer.

14. A method performed by a hand-portable electronic device, the method comprising;
   providing for spatial information of one or more physical objects in a space around the hand-held portable electronic device for collision avoidance involving the one or more physical objects in the space around the hand-held portable electronic device by transmitting one or more electromagnetic, wireless detection signals and detecting one or more reflections of said one or more electromagnetic, wireless detection signals from the one or more objects, wherein the detection-and-ranging element is configured to transmit the one or more electromagnetic, wireless detection signals at a repetition rate of less than 10 Hz.

15. A method performed by a hand-portable electronic device, the method comprising;
   providing spatial information of one or more physical objects in a space around the hand-held portable electronic device for collision avoidance involving the one or more physical objects in the space around the hand-held portable electronic device by;
   transmitting one or more electromagnetic, wireless detection signals, wherein the one or more electromagnetic, wireless detection signals are transmitted at a repetition rate of less than 10 Hz; and
   detecting one or more reflections of said one or more electromagnetic, wireless detection signals from the one or more objects.

* * * * *